(No Model.)
H. L. DOULTON & W. P. RIX.
PRODUCTION OF ORNAMENTAL POTTERY WARE.
No. 366,310.                     Patented July 12, 1887.
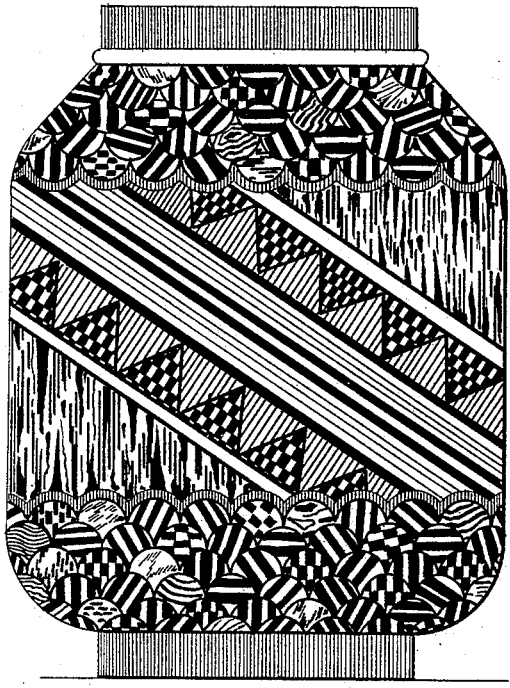

United States Patent Office.

HENRY LEWIS DOULTON AND WILTON PARKER RIX, OF LONDON, ENGLAND.

PRODUCTION OF ORNAMENTAL POTTERY-WARE.

SPECIFICATION forming part of Letters Patent No. 366,310, dated July 12, 1887.

Application filed January 31, 1887. Serial No. 226,063. (No model.)

*To all whom it may concern:*

Be it known that we, HENRY LEWIS DOULTON and WILTON PARKER RIX, subjects of the Queen of Great Britain, residing at Lambeth Pottery, London, England, potters, have invented certain new and useful Improvements in the Production of Ornamental Pottery-Ware, of which the following is a specification.

This invention has for its object improvements in the production of ornamental pottery-ware. For this purpose we build up a block in clay of various colors. From this block we cut party-colored slices, and with such slices we mold or otherwise form the required article; or we apply the party-colored slice as an ornament to the surface of an article otherwise molded or formed.

The accompanying drawing represents in elevation a vase made in accordance with our invention.

We proceed as follows: We take a mass of plastic clay and cut it into layers or slices. Having produced a number of such layers from plastic clays of various tints, we next superpose the layers in order, according to the effect we desire to produce, and compress the whole into one solid mass. We then cut thin cross or angular sections of this party-colored mass and apply them directly in the manufacture of the ware. Or we take the above-mentioned party-colored layers and superpose these as before, alternately or otherwise, with thin plain-colored layers, or layers of any other pattern, and again compress the whole into a solid mass. From this mass we cut thin cross or angular sections and apply them in the manufacture of the ware. Sometimes we alternate the superposed plastic layers with a layer of finely-sifted clay-dust.

Other methods by which we build up a party-colored block are as follows: We form long rods of any section in plastic clay of various colors, and, having laid these side by side and also above each other in any order or color to form a prearranged pattern, we compress the whole into a solid mass and obtain sections as before mentioned; or, having formed rods, layers, or lengths of plastic clay, simple or complex, we lay or suspend them in prearranged order in a box or trough, keeping them apart and supporting them in position by threads, wires, or other suitable means. We then fill the intervening space in the box or trough with clay of any color in a "slurry" or "slip" state. We allow the mass to consolidate by evaporation.

Sometimes we take the masses produced by any of the above-named means, and having cut these parallel with the length or in cross or angular section, (or both,) we rearrange the pieces in different and geometrical position, so that after compression a new combination is formed in the section-pattern. Or a party-colored block can also be prepared by taking a soft mass of plastic clay and running it into any form by means of a templet in a manner similar to that used for forming plaster moldings. Upon this a soft mass of plastic clay of a different color may be laid, using a templet of a different outline, proceeding as before. In this way by using templets of suitable outline a series of layers or strata are superposed, the form of which layers is controlled by the form of the templets used, thus producing, when cut angular or crosswise, sections of any prearranged pattern, which may be used as before described.

Party-colored slices obtained by the means above described we either use as the material for the formation of the ware by molding or otherwise, or for the surface decoration of ware already formed.

When the party-colored slice is used for the formation of the ware, the molding or shaping of the article is effected in any of the usual ways, and it is burned and finished with the ordinary precautions. When the party-colored slice is used for surface decoration, the slice should be thin. The article to receive the decoration should itself be in a semi-plastic state, and the surfaces which are required to adhere should be slightly moistened and gently pressed together. Afterward, when sufficiently dry, the article is fired and finished as usual.

Having now particularly described and ascertained the nature of our said invention and in what manner the same is to be performed, we declare that what we claim is—

1. The process in the production of ornamental pottery-ware consisting in building up a party-colored block of clay, cutting slices from such block, and molding or forming such slices into the articles required, and afterward burning the articles, substantially as described.

2. The process in the production of ornamental pottery-ware consisting in building up a party-colored block of clay, cutting slices from such block, applying the said slices to articles of pottery-ware, causing them to adhere, and afterward burning the articles, substantially as described.

HENRY LEWIS DOULTON.
    WILTON PARKER RIX.

Witnesses:
 JAMES E. OZANNE,
*Clerk*, 19 *Broomwood Rd.*, *London, S. W.*
 WALTER H. BURBRIDGE,
*Clerk*, 1 *Wintewell Rd.*, *Brixton Rise.*